United States Patent Office 3,522,511
Patented Aug. 4, 1970

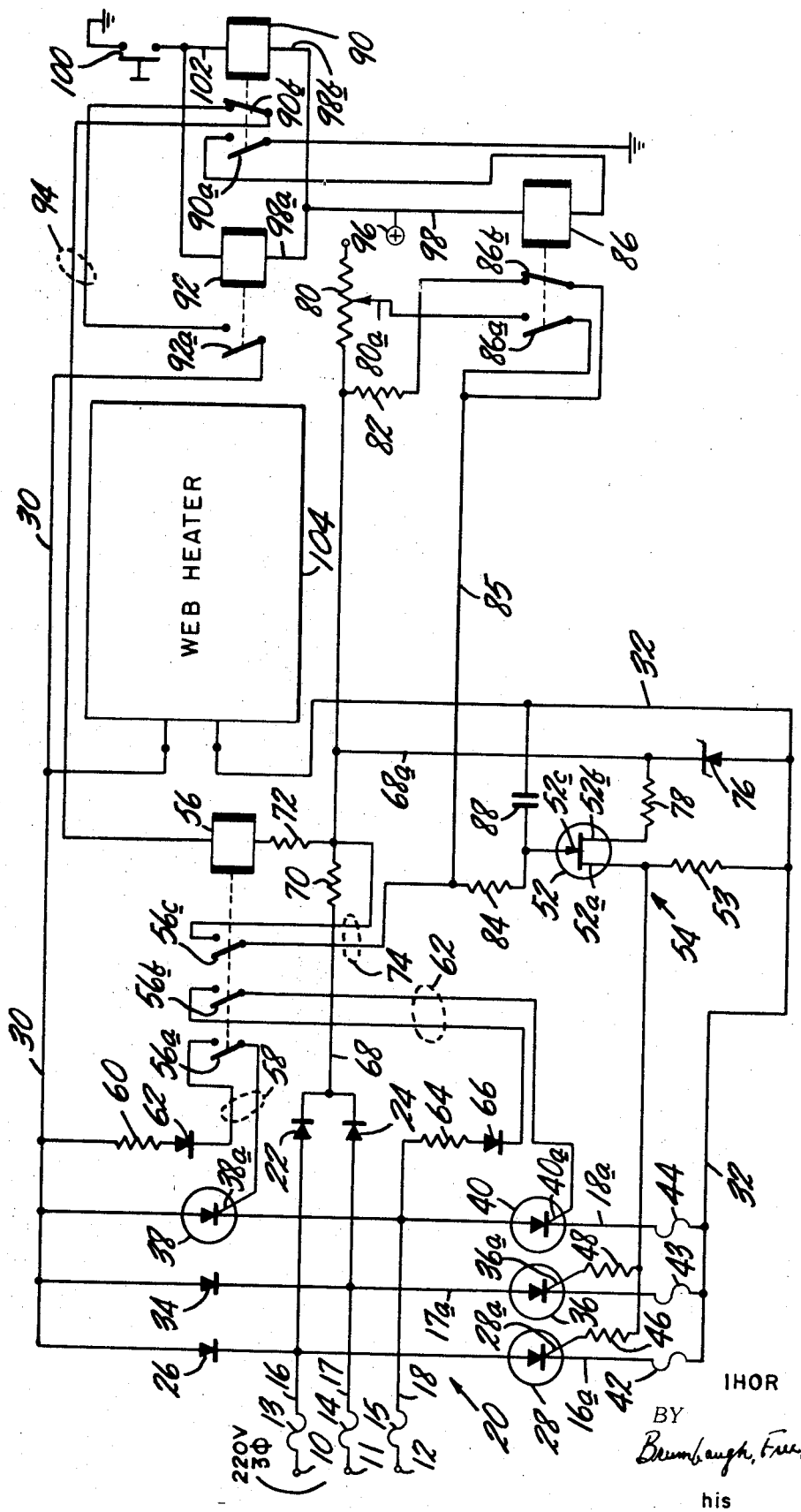

3,522,511
POLYPHASE POWER CONTROL CIRCUIT FOR WEB HEATERS
Ihor Wyslotsky, Evanston, Ill., assignor to Standard Packaging Corporation, New York, N.Y., a corporation of Virginia
Filed July 9, 1968, Ser. No. 743,556
Int. Cl. H02m 7/20; H05b 3/00, 1/02
U.S. Cl. 321—5                    12 Claims

ABSTRACT OF THE DISCLOSURE

As described herein, the conductivity in each leg of a three phase rectifier bridge circuit is selectively controlled in order to supply a variable DC power signal to the web heater of a vacuum packaging machine. In two legs of the rectifier bridge circuit, a silicon controlled rectifier and a diode are connected in series between a pair of bus bars. The conductivity of the silicon controlled rectifiers is controlled by a unijunction transistor relaxation oscillator circuit having a variable frequency of operation. The third rectifier leg includes a pair of silicon controlled rectifiers connected in series between the bus bars and a pair of 90° phase shift triggering circuits coupled to the gate terminals of the silicon controlled rectifiers for a selected period of time control the conductivity of the silicon controlled rectifiers.

BACKGROUND OF THE INVENTION

This invention relates to polyphase power control circuits and, more particularly, to polyphase power control circuits which control the magnitude of the DC output voltage supplied to heating devices, such as the web heaters employed in packaging machines.

In one type of packaging machine, a film or web is fed from a roll onto a rotating drum which carries a series of trays. The film is initially heated by a web heater which is enclosed by a heat concentrating or directing sheath and then drawn by suction into the trays to form pockets in the film. A cover film is fed from a second roll to the drum and, at the same time, a product is fed to the pockets of the formed film. The cover film is then heat-sealed to the formed film to form individual packages from which air is evacuated before the package is finally sealed.

The web heaters employed in such vacuum packaging machines are voltage dependent and generally require two different input power voltages. An intially high input voltage is required to bring the heater up to its heat generating capacity in as short a period of time as possible and thereafter a regulatable voltage is required. Heretofore, the voltage control circuits for controlling the magnitude of the voltage supplied to the web heaters have included manually operable overvoltage booster transformers and manually operable conventional transformers. These control circuits, as can be appreciated, are expensive to both purchase and maintain and are generally quite complex.

SUMMARY OF THE INVENTION

Accordingly, it is an object of the present invention to provide a polyphase power control circuit for voltage dependent heating devices which overcomes the above-mentioned disadvantages of the prior art.

It is another object of the invention to provide a polyphase power control circuit of the above type which is characterized by its simplicity, low cost, compactness and reliability.

It is still another object of the present invention to provide a polyphase power control circuit of the above type which automatically provides an initially high power voltage for a selected period of time and thereafter provides a manually regulatable power voltage.

These and other objects are accomplished by a polyphase power control circuit for heating devices arranged according to the present invention which provides an initially high power voltage to the heating device for a selected period of time and which thereafter provides a manually regulatable power voltage to the heating device.

In a preferred embodiment of the invention, a rectifier bridge circuit is provided which includes in each leg thereof a pair of unidirectional current conducting devices, at least one of the current conducting devices being trigger operated. Also provided is an oscillator circuit having a variable frequency of operation for controlling the conductivity of the trigger operated undirectional current conducting devices in at least two legs of the rectifier bridge circuit. The conductivity of the trigger operated unidirectional current conducting device in at least one other leg of the rectifier bridge circuit is controlled by a phase shifter network coupled to the current conducting device for a selected period of time. During the period of time over which the trigger operated unidirectional current conducting device is rendered conductive, a fixed high voltage is supplied to the heating device. Thereafter, the magnitude of the output voltage can be controlled by varying the frequency of oscillation of the oscillator circuit.

BRIEF DESCRIPTION OF THE DRAWING

In the drawing:

The figure is a schematic circuit diagram of an illustrative polyphase power control circuit for voltage responsive heating devices arranged according to the present invention.

DESCRIPTION OF THE PREFERRED EMBODIMENT

In an illustrative embodiment of a polyphase power control circuit for voltage responsive heating devices arranged according to the present invention, as shown in the figure, a 220 volt, three phase power voltage signal is supplied across three input terminals 10, 11 and 12. The terminals 10, 11 and 12 are coupled through protective fuses 13, 14 and 15 and a plurality of conductors 16, 17 and 18, respectively, to a full-wave rectifier bridge circuit 20. Also coupled through the conductors 16 and 17 to the input terminals 10 and 11, respectively, are a pair of diodes 22 and 24 which are rendered conductive when the voltage signals supplied to terminals 10 and 11 are positive.

The first leg of the rectifier bridge circuit 20 includes a diode 26 connected in series with a silicon controlled rectifier ("SCR") 28 and between a negative DC bus bar 30 and a positive DC bus bar 32 by a branch conductor 16a of the conductor 16. A second leg of the rectifier bridge circuit 20 includes a diode 34 connected in series with an SCR 36 between the DC bus bars 30 and 32 by a branch conductor 17a of the conductor 17. The third leg comprises a pair of SCR's 38 and 40 connected in series and between the bus bars 30 and 32 by a branch conductor 18a of the conductor 18. Protective fuses 42, 43 and 44, respectively, are also included in each leg of the rectifier bridge circuit 20 between the SCR's 28, 36 and 40, respectively, and the positive DC bus bar 32.

A pair of current limiting resistors 46 and 48 couple the gate terminals 28a and 36a of the SCR's 28 and 36, respectively, to a common conductor 50. The conductor 50 is further coupled to the base one 52a of a unijunction transistor 52 and a load resistor 53 interposed between the base one 52a and the positive DC bus bar 32. The unijunction transistor 52 is included in a conventional unijunction transistor relaxation oscillator firing circuit 54 which, as will be apparent hereinbelow, supplies triggering pulses to the gate terminals 28a and 36a of the SCR's at a fixed frequency rate during a first mode of operation and which supplies triggering pulses to the terminals 28a and 36a at a variable frequency rate in the second mode of operation to drive the SCR's 28 and 36 into conduction.

The gate terminal 38a of the SCR 38 in the third leg of the rectifier circuit 20 is connected across a normally open contact 56a of a relay 56 by a pair of conductors 58. A 90 degree phase shift triggering circuit for the SCR 38 includes a resistor 60 and a diode 62 coupled between the negative bus bar 30 and the normally open terminal of the contact 56a. As is understood in the art, the resistor 60 limits the peak gate current while the diode 62 prevents reverse voltage from being applied across the cathode of the SCR and the gate terminal 38a. Similarly, the gate terminal 40a of the SCR 40 is connected across a second normally open contact 56b of the relay 56 by a pair of conductors 62 and a 90° phase shift triggering circuit for the SCR 40 includes a current limiting resistor 64 and a diode 66 connected between the conductor 18 and the normally open terminal of the contact 56b. By suitably selecting the values of the resistors 60 and 64, firing of the SCR's 38 and 40 can be controlled over an angle of 90°, as is understood in the art.

The cathodes of the diodes 22 and 24 are connected together and coupled through a conductor 68 and a resistor 70 to a resistor 72 in series with one input terminal of the relay 56 and across a third normally open contact 56c of the relay 56 via a pair of conductors 74. Also connected to the diodes 22 and 24 through the resistor 70 via a branch conduotcr 62a of the conductor 68 is a Zener diode 76 and a resistor 78 in series with the base two 52b of the unijunction transistor 52. The anode of the Zener diode 76 is coupled to the positive DC bus bar 32, the diode 76 operating as a voltage regulator and clipping the gate voltage at a predetermined voltage such as, for example, 20 volts. Further coupled to the diodes 22 and 24 through the resistor 70 and via the conductor 68 are a potentiometer 80 and a resistor 82 connected in parallel with the potentiometer 80. As will be explained in detail hereinbelow, the potentiometer 80 is provided to control the magnitude of the gate voltage supplied to the emitter 52c of the unijunction transistor 52 and, accordingly, the frequency of oscillation of the circuit 54.

The actuating arm of the contact 56c of the relay 56 is connected via one of the condutcors 74 to a charging resistor 84 and via an additional conductor 85 to the actuating arms of a pair of contacts 86a and 86b associated with a relay 86. The charging resistor 84 is connected to the emitter 52c of the unijunction transistor 52 and to a capacitor 88 interposed between the emitter 52c and the positive bus bar 32. As will be apparent hereinbelow, during the first mode of operation, the resistor 84 controls the firing angle of the unijunction transistor 52 by regulating the charging rate to the capacitor 88. During the second mode of operation, the resistor 84 and the potentiometer 80 control the firing angle of the unijunction transistor 52 by regulating the charging rate to the capacitor 88. When the unijunction transistor is rendered conductive the voltage pulse developed across the load resistor 53 as the unijunction transistor 52 discharges the capacitor 88 is coupled simultaneously to the gates 28a and 36a of the SCR's 28 and 36 to render conductive that SCR which has an anode voltage which is positive with respect to the positive bus bar 32.

The other input terminal of the relay 56 is coupled through a normally closed contact 90b of a time delay relay 90 to a normally open contact 92a associated with a conventional relay 92 via a pair of conductors 94. The time delay relay 90, which may be of conventional construction, is operative to close or open its associated contacts a predetermined time after the relay is energized. With regard to the relay 92, the contact 92a will close almost instantaneously with the energization of the relay. The actuating arm of the contact 92a is connected to the negative bus bar 30. A second normally open contact 90a of the time delay relay 90 is coupled between ground and one input terminal of the relay 86. As above described the relay 86 includes a normally open contact 86a connected in series between the conductor 85 and the center tap 80a of the potentiometer 80 and a normally closed contact 86b which is coupled in series between the resistor 82 and the conductor 85.

A source of positive DC potential 96 is provided and supplies a positive DC voltage to the input terminals of the relay 86 and the relays 92 and 90 through a conductor 98 and its branch conductors 98a and 98b, respectively. The other input terminals of the relays 90 and 92 are connected together and to a start switch 100 via a conductor 102. The negative and positive DC bus bars 30 and 32, respectively, are coupled to a conventional voltage dependent web heater 104 of the type employed in vacuum packaging machines.

As above mentioned, it is generally necessary to provide an initially high power voltage to the voltage dependent web heater 104 in order to bring the heater up to its heat generating capacity in as short a period of time as possible. Accordingly, in operation, the start switch 100 is depressed to couple ground to the input terminals of the time delay relay 90 and the relay 92. This implements the energization of both relays and the contact 92a of the relay 92 closes. Although the time delay relay 90 is energized, its associated contacts 90a and 90b are not actuated at this time. A conductive path for current is created between the negative DC bus bar 30 and the relay 56 via the conductors 94 and the contacts 92a and 90b to implement the energization of the relay 56. Energization of the relay 56 causes its associated contacts 56a, 56b and 56c to close. When the contacts 56a and 56b close, the phase shift triggering circuits associated with the SCR's 38 and 40 are connected to the gate terminals 38a and 40a of the SCR's 38 and 40. The SCR 38 will be rendered conductive during that portion of the negative half cycle where the voltage appearing at the cathode of the SCR 38 is negative with respect to the negative bus bar 30. Similarly, the SCR 40 will be rendered conductive during the positive half cycle where the voltage appearing at the anode thereof is positive with respect to the positive DC bus bar 32. Hence, during both the positive and negative cycles of the input voltage signal appearing at the input terminal 12, a conductive path is created in the third leg of the rectifier bridge circuit 20.

In addition, during the positive half cycles of the voltage signals applied to input terminals 10 and 11, the diodes 22 and 24 will be rendered conductive and couple a positive DC signal through the resistor 70 and the contact 56c to the charging resistor 84. Hence, a charging circuit comprising the resistors 70 and 84 and the capacitor 88 is provided. The resistors 70 and 84 control the firing angle of the unijunction transistor 52 by regulating the charging rate of the positive potential to the capacitor 88. The pulse of voltage developed across the load resistor 53 as the unijunction discharges the capacitor 88 is coupled simultaneously to the gate terminals 28a and 36a of the SCR's 28 and 36 through the current limiting resistors 46 and 48. Whichever SCR has an anode voltage which is positive with respect to the bus bar 32 when the trigger pulse is generated will conduct and will remain in conduction until the end of the positive half cycle. In view of the foregoing, it can be seen that the SCR's in each leg of the rectifier bridge circuit 20 will be rendered conductive during each phase of the applied 220 volt, three phase signal in the first mode of operation, the duration of which is controlled by the delay constant in the time delay relay 90, and the output DC voltage supplied to the web heater 104 will be high.

After the delay period which may last for example, about two seconds, the contacts 90a and 90b of the relay 90 are actuated. The actuation of the contact 90b to its open position breaks the circuit between the relay 56 and the negative DC bus bar 30 and causes the deenergization of the relay 56. Deenergization of the relay 56 causes the contacts 56a, 56b and 56c to return to their normally open positions and the conductive paths between the phase shift triggering circuits and the SCR's 38 and 40 is opened. Hence, the SCR's 38 and 40 will be rendered non-conductive and the conductive path between the resistor 70 and the resistor 84 will be broken. However, with the closing of the contact 90a the relay 86 will be energized and its associated contacts 96a and 96b will close and open, respectively. A conductive path is thereby created between the resistor 70 and the resistor 84 through the potentiometer 80. By suitable variation of the potentiometer 80, the firing angle of the unijunction transistor 52 may be controlled and, accordingly, the conduction of the SCR's 36 and 40. It can be seen, therefore, that the amount of DC power voltage supplied to the web heater 104 by the rectifier bridge circuit 20 can be varied steplessly merely by varying the amount of resistance in the charging circuit of the unijunction transistor relaxation oscillator firing circuit 54.

Although the invention has been described herein with reference to a specific embodiment, many modifications and variations will readily occur to those skilled in the art. Accordingly, all such variations and modifications are included within the intended scope of the invention as defined by the following claims.

I claim:
1. A polyphase power control circuit for voltage dependent heating devices requiring an initially high input DC voltage for a selected period of time and thereafter a regulatable input DC voltage, which comprises rectifier bridge means adapted to receive an applied polyphase AC power voltage, each leg of the rectifier bridge means including at least one trigger operated unidirectional current conducting device, oscillatory circuit means having a variable frequency of oscillation for controlling the conductivity of the trigger operated unidirectional current conducting devices in at least two legs of the rectifier bridge means, time delay switch means for rendering conductive for a selected period of time the unidirectional current conducting device in at least one other leg of the rectifier bridge means and control means for controlling the frequency of oscillation of the oscillatory circuit means.

2. A polyphase power control circuit according to claim 1 wherein each of the at least two legs of the rectifier bridge means comprises a unidirectional current conducting device and a trigger operated unidirectional current conducting device connected in series between a pair of DC bus bars and wherein the at least one other leg of the rectifier bridge means comprises a pair of trigger operated unidirectional current conducting devices connected in series between the pair of DC bus bars.

3. A polyphase power control circuit according to claim 2 wherein each of the trigger operated unidirectional current conducting devices in the at least one other leg of the rectifier bridge means has associated therewith a phase shift triggering circuit operatively coupled to the device by the time delay switch means for the selected period of time for triggering the device into conduction at a selected phase angle of the applied AC voltage.

4. A polyphase power control circuit according to claim 3 wherein the time delay switch means comprises a switch energizable time delay relay having associated contacts actuated a selected period of time after energization of the relay means for creating a conductive path between the triggering circuits associated with the trigger operated unidirectional current conducting devices in the at least one other leg of the rectifier bridge means and the gate terminals of the trigger operated unidirectional current conducting devices.

5. A polyphase power control circuit according to claim 4 wherein the switch energizable time delay relay has further associated contacts actuated a selected period of time after energization of the relay for creating a conductive path between the control means and the oscillatory circuit means.

6. A polyphase power control circuit according to claim 1 wherein the oscillatory circuit means comprises a unijunction transistor relaxation oscillator circuit and the control means comprises a potentiometer included in the charging circuit of the oscillatory circuit means.

7. In a packaging machine wherein a flexible web is uniformly heated by a voltage dependent web heater prior to being vacuum formed in a cavity, the improvement which includes a polyphase power control circuit for the web heater, the control circuit comprising rectifier bridge means adapted to receive an applied polyphase AC power voltage, each leg of the rectifier bridge means including at least one trigger operated unidirectional current conducting device, oscillatory circuit means having a variable frequency of oscillation for controlling the conductivity of the trigger operated unidirectional current conducting devices in at least two legs of the rectifier bridge means, time delay switch means for rendering conductive for a selected period of time the unidirectional current conducting device in at least one other leg of the rectifier bridge means and control means for controlling the frequency of oscillation of the oscillatory circuit means.

8. The improvement according to claim 7 wherein each of the at least two legs of the rectifier bridge means comprises a unidirectional current conducting device and a trigger operated unidirectional current conducting device connected in series between a pair of DC bus bars and wherein the at least one other leg of the rectifier bridge means comprises a pair of trigger operated unidirectional current conducting devices connected in series between the pair of DC bus bars.

9. The improvement according to claim 8 wherein each of the trigger operated unidirectional current conducting devices in the at least one other leg of the rectifier bridge means has associated therewith a phase shift triggering circuit operatively coupled to the device by the time delay switch means for the selected period of time for triggering the device into conduction at a selected phase angle of the applied AC voltage.

10. The improvement according to claim 9 wherein the time delay switch means comprises a switch energizable time delay relay having associated contacts actuated a selected period of time after energization of the relay means for creating a conductive path between the triggering circuits associated with the trigger operated unidirectional current conducting devices in the at least one other leg of the rectifier bridge means and the gate terminals of the trigger operated unidirectional current conducting devices.

11. The improvement according to claim 10 wherein the switch energizable time delay relay has further associated contacts actuated a selected period of time after energization of the relay for creating a conductive path between the control means and the oscillatory circuit means.

12. The improvement according to claim 7 wherein the oscillatory circuit means comprises a unijunction transistor relaxation oscillator circuit and the control means comprises a potentiometer included in the charging circuit of the oscillatory circuit means.

References Cited

UNITED STATES PATENTS

| 2,271,738 | 2/1942 | Leftwich | 321—16 X |
| 2,758,251 | 8/1956 | Shrider et al. | 321—38 X |
| 3,005,898 | 10/1961 | Rosenthal | 219—493 X |
| 3,383,581 | 5/1968 | Rosenberry | 321—16 |

LEE T. HIX, Primary Examiner

W. H. BEHA, JR., Assistant Examiner

U.S. Cl. X.R.

219—243, 493, 501; 321—16, 47